Patented July 14, 1931

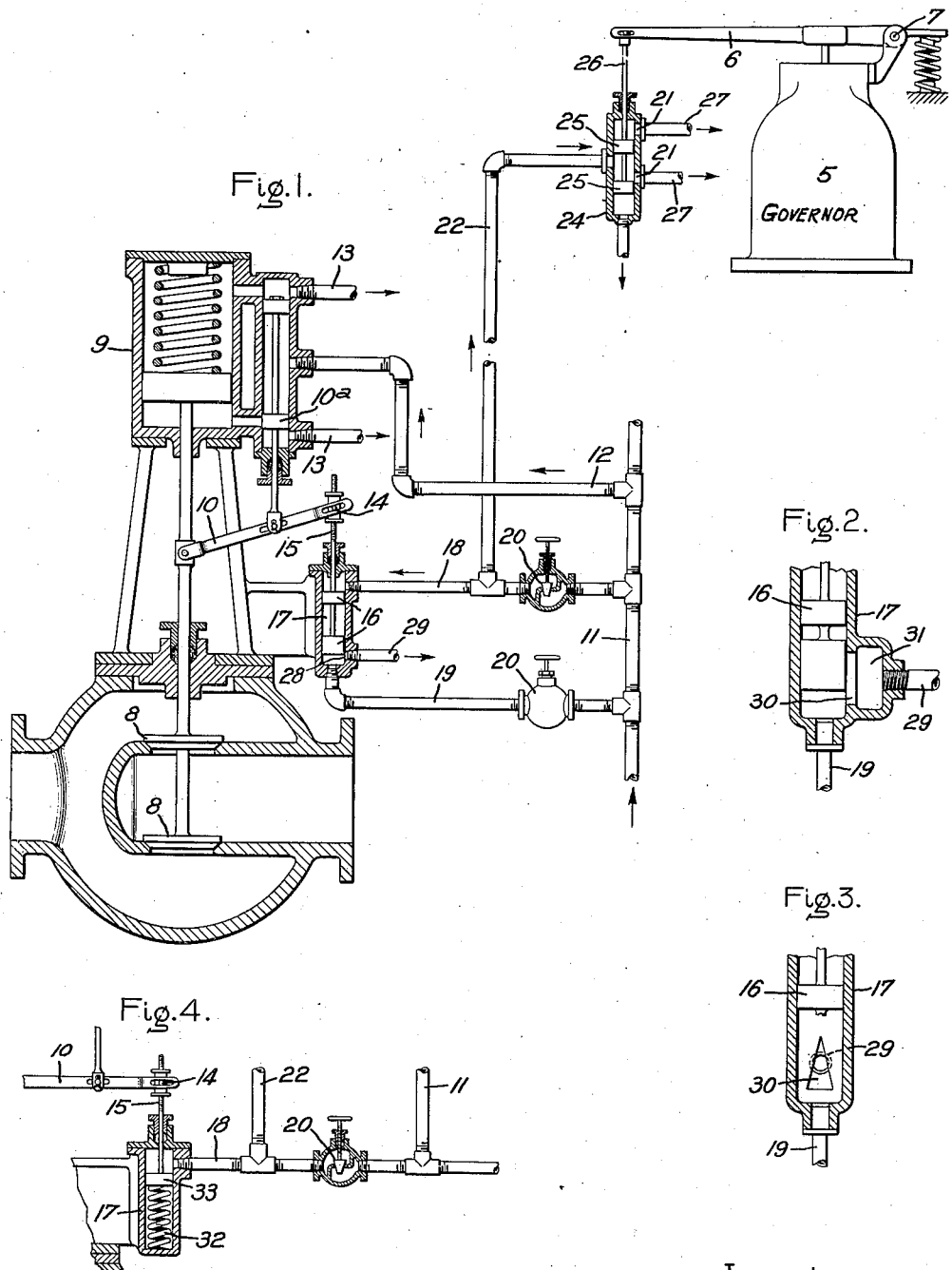

1,814,827

UNITED STATES PATENT OFFICE

REED J. CAUGHEY, OF SCHENECTADY, NEW YORK, ASSIGNOR TO GENERAL ELECTRIC COMPANY, A CORPORATION OF NEW YORK

HYDRAULIC CONTROL SYSTEM

Application filed June 7, 1929. Serial No. 369,212.

The present invention relates to a hydraulic control system for operatively connecting a movable element of one piece of apparatus with a movable element of the same or another piece of apparatus whereby the one element may move in response to and in definite relation to the other element.

According to my invention I provide an improved control system of the character above described which permits the elements connected and controlled thereby to be separated beyond the practical limits of a direct or mechanical connection without sacrificing the simplicity and reliability of such direct or mechanical connection.

The system of the present invention is well adapted for connecting the controlled and controlling elements of governor mechanisms such as are employed to regulate the admission of motive fluid to prime movers in response to changes in load or speed (when it is not expedient to mechanically connect such elements). Furthermore, the hydraulic control system of the present invention is readily adapted for utilizing the fluid pressure source usually provided in connection with such prime mover governing mechanisms.

For the above reasons, but not in any way as a limitation upon the scope of the invention or its range of application, the same is herein described and illustrated in the accompanying drawings in connection with a hydraulic prime mover governing mechanism having a speed governor as the controlling element and a servo-motor as the controlled element, the latter in turn controlling a throttle valve. This is a usual and simple arrangement in a governing mechanism and is, together with a control system embodying the invention, diagrammatically shown in Fig. 1 of the drawings. Figs. 2 and 3 of the drawings are detail side and front views respectively in section and on an enlarged scale of a modification. Fig. 4 is a diagrammatic view of a modified form of a portion of the control system shown in Fig. 1.

Referring to Fig. 1, 5 is an operating or speed governor for a prime mover representing any suitable controlling element or device. The governor is provided with a movable control part in the form of a lever 6 which moves in response to speed changes. In the present example it moves about a fulcrum 7 downwardly for an increase in speed and upwardly in response to a decrease in speed. At 8 is shown an admission or throttle valve which is controlled by a servo-motor 9 in turn controlled by its pilot valve lever 10 which operates the pilot valve 10a. Operating fluid for the servo-motor is supplied from any suitable source by a pipe 11 which may be a pipe connecting with the pressure oil system of the prime mover (not shown) with which connection is made through a pipe 12. Leakage and exhaust oil is conducted from the servo-motor by suitable drain pipes 13. The arrangement of the servo-motor control is such that an upward movement of the pilot valve lever at 14 causes the servo-motor to close the throttle valve a corresponding amount and a downward movement in a similar manner causes the throttle valve to open a corresponding amount. As this type of apparatus is old and well understood, further description thereof is believed to be unnecessary.

In ordinary practice, as is well-known and understood, the governor lever 6 is connected directly or through a short mechanical connection with the pilot valve lever so that the latter moves directly therewith or in direct response to operation of said governor. In the present example, however, it is assumed that the governor and the servo-motor are too widely separated, as indicated in the drawings, or separated in such a manner that a direct or mechanical connection is not possible or desirable, and in lieu of such connection the control system of the present invention is provided.

Controlling the pilot valve lever of the servo-motor and connected therewith at end 14 by suitable means, such as a rod 15, is a movable abutment or piston 16 which is adapted to move in a closed casing or cylinder 17. Operating fluid for the abutment in response to which it moves the pilot valve lever, is supplied from a source of suitable pressure through a pair of conduits 18 and 19. Conduits 18 and 19 are connected with opposite ends of cylinder 17 so that pressure from the source is supplied on opposite sides of the abutment. In the present example pressure is supplied from pipe 11 of the oil system as a convenient source and is throttled to a suitable pressure by a reducing valve 20 in each conduit.

With the above arrangement the abutment and connected pilot valve remain stationary when a balance of pressure is obtained on opposite sides of the abutment, the initial setting with the pilot valve in the neutral position, as shown, being obtained by adjusting valves 20. By varying the pressure on one side of the abutment, the latter is made to respond to the pressure difference then acting upon it and moves the pilot valve. Movement of the abutment and pilot valve is stopped by correspondingly varying the pressure on the opposite side of the abutment to again equalize the pressures.

This method of control is carried out by providing in connection with each side of the abutment a valve means through which the operating fluid supplied thereto may flow at various definite rates, thereby varying the pressure acting upon the opposite sides of the abutment. The valve means employed may be of any suitable form and in the present example are variable orifices as the preferred form.

One orifice, indicated at 21, is formed in a casing 24 located adjacent the governor. Casing 24 is connected by a conduit 22 to one of the abutment supply pipes. In the present example conduit 22 is connected with conduit 18 whereby orifice 21 controls the pressure acting upon the upper side of the abutment. The discharge area of orifice 21 is varied by a covering means in the form of a sliding valve 25 located in the cylinder and connected by a rod 26 with the governor lever. A conduit 27, forming a continuation of conduit 22, serves to carry the oil discharged through the orifice to any suitable point.

The other orifice, provided in connection with the opposite side of the abutment, is controlled by the abutment, and the control arrangement therefor may be the same as or similar to that for the governor. In the present example, the orifice is located, as indicated at 28, directly in the wall of casing 17. It is thus directly connected through casing 17 with the lower side of the abutment and with conduit 19 without additional conduit connection and is so located that the lower end of the abutment serves as a covering means or valve to vary the flow therethrough. The abutment is thus directly in control of the orifice which forms a discharge outlet for conduit 19 in the same manner that orifice 21 forms the discharge outlet for conduit 22. As will be seen, this arrangement also does away with the necessity for a separate cylinder and valve for the orifice. A pipe connection 29 is provided for the orifice to conduct the oil discharge therefrom.

Movement of the governor lever causes orifice 21 to vary in size, thereby correspondingly varying the pressure in conduits 22 and 18 and in cylinder 17 on the upper side of the abutment. The resulting movement of the abutment in response to the differential pressure causes orifice 28 to vary in size. Movement of the abutment stops when it reaches a new position in which orifice 28 has opened or closed sufficiently to establish a rate of flow such that the pressure on the lower side of the abutment reaches that on the upper side as established by the orifice 21. In this manner the pilot valve lever 10 is moved in response to and in accordance with movement of the governor lever. The effect of a direct mechanical connection is obtained by making the orifices and the means by which they are varied of the same size as indicated in the drawings. The abutment and pilot valve lever then move the same distance as the governor lever moves for each change of position of the latter. In the present example the arrangement is such that pilot valve lever 10 is moved upwardly in response to a downward movement of the governor lever and vice versa whereby valve 8 moves toward the closed or open position in response to increased or decreased speed respectively of the governor.

In order that the controlled element may be adjusted to take up any desire position with respect to a certain position of the controlling element, an adjustable connection is provided between said elements. This may be provided in connection with either orifice controlling means, as for example, by making the connection 14 between the pilot valve lever and rod 15 adjustable as indicated in Fig. 1. The servo-motor through its pilot valve lever may be adjusted thereby to effect an opening or closing of valve 8, while the governor is operating at normal speed, for example.

If other than the effect of a direct mechanical connection is desired between the movable parts of the controlling and controlled elements, that is, between the movable part or governor lever of the governor and the movable part or pilot valve lever of the servo-motor, the rate at which one orifice is varied, in response to a given movement of the means by which it is varied, may be changed in any suitable manner as by changing the shape of one or both of the orifices. By way of example, a change in the orifice connected with the lower side of the abutment is shown at 30 in Figs. 2 and 3. In this modification an elongated V-shaped orifice is provided in the wall of cylinder 17 and a chambered connection 31, Fig. 2, is provided for outlet conduit 29. With this arrangement the abutment is caused to move increasingly greater distances to effect the same change in flow and in pressure as it moves away from the closed position. It will be seen that, assuming this orifice to be substituted in Fig. 1 for orifice 28 and assuming that equal movement of the controlling means for orifice 21 effects an equal change in the opening thereof, that the response of the abutment thereto is at first slow or slight and then increasingly greater as orifice 21 is opened wider.

Referring to Fig. 4, a pilot valve operating mechanism is shown associated with cylinder 17 which is similar to that described relative to Fig. 1 except that a calibrated spring 32 is installed below the movable abutment 33 instead of employing an orifice 28. Spring 32 applied pressure to the lower side of abutment 33 in opposition to the fluid pressure means on the upper side which is controlled by the pressure varying means 25, 21 of Fig. 1. Correct calibration of spring 32 will cause abutment 33 to move exactly in the same manner as the pilot valve 25.

With the system of the present invention, while the source of fluid pressure for the operation thereof is preferably constant, it need not necessarily be so for the reason that the movable abutment is connected at each end with the same supply source. Hence variations in pressure affect each end of the abutment equally or substantially equally without causing any appreciable movement thereof.

From the foregoing description, it will be seen that the control systems of the present invention involve few parts of simple construction and is easily adapted to a variety of separated controlling and controlled apparatus, a single pipe or conduit connection only being required between such apparatus.

What I claim as new and desire to secure by Letters Patent of the United States, is:—

1. In a control system of the character described, a movable abutment, means for applying fluid pressure to one side of the abutment, means for varying the pressure on said side of the abutment to move the latter, a control device having a moving control part connected with said pressure varying means to operate the same, means for applying fluid pressure to the opposite side of said abutment in opposition to said first named fluid pressure for positioning the abutment, means controlled by movement of the abutment for varying the fluid pressure on said opposite side of said abutment, and a controlled device having a movable part connected with the abutment to be moved thereby.

2. In a control system of the character described a movable abutment, means for applying fluid pressure to opposite sides of the abutment for positioning the abutment, means for varying the fluid pressure on one side of the abutment to move the latter in opposition to the fluid pressure on the other side, a control device having a moving control part connected with said pressure varying means to operate the same, means controlled by movement of the abutment for varying the fluid pressure on the opposite side of said abutment, and a controlled device having a movable part connected with the abutment to be moved thereby.

3. In a control system of the character described, a movable abutment, a casing in which the abutment moves, means for supplying fluid pressure to the casing on opposite sides of the abutment, a variable orifice connected with the casing on one side of the abutment, means for varying said orifice, a variable orifice connected with the casing on the other side of the abutment, said orifice being controlled by the abutment, and control apparatus connected with the abutment to be operated thereby.

4. The combination with a device having a movable control part and a second device having a movable part adapted to be controlled by that of the first-named device, of a control system connecting said movable parts, said system comprising a movable abutment connected with the movable part of the second device, a source of operating fluid for the movable abutment, a conduit connecting said source with one side of the abutment, a variable orifice providing a discharge outlet for said conduit, said orifice being controlled by the movable part of the first-named device, a second conduit, connecting the source of operating fluid with the opposite side of the abutment, and a variable orifice providing a discharge outlet for said conduit, said orifice being controlled by the movable abutment.

5. The combination with a prime mover governor and a servo-motor comprising a valve adapted to be controlled thereby, of a connecting control system therefor comprising, a movable abutment connected with the servo-motor valve to operate the same, a casing in which the abutment moves, a conduit connected to the casing on one side of the abutment for applying fluid pressure thereto, a conduit connected to the casing on the other side of the abutment for applying fluid pressure thereto to balance the fluid pressure on the opposite side of the abutment, and means connected in each of said conduits for varying fluid flow therethrough, said means in one conduit being associated .with and controlled by the governor and said means in the other conduit being associated with and controlled by the movable abutment.

6. The combination with a prime mover governor and a servo-motor comprising a valve adapted to be controlled thereby, of a connecting control system therefor comprising, a movable abutment connected with the servo-motor valve to operate the same, a casing in which the abutment moves, a source of fluid pressure, a pair of conduits connecting the casing on opposite sides of the abutment with the source, means connected in each of said conduits for varying fluid flow therethrough, said means in one conduit being associated with and controlled by the governor and said means in the other conduit being associated with and controlled by the movable abutment, and a valve means connected in each conduit between the flow varying means and the source of fluid pressure.

In witness whereof, I have hereunto set my hand this 6th day of June, 1929.

REED J. CAUGHEY.